(12) United States Patent
Zheng et al.

(10) Patent No.: US 12,590,835 B2
(45) Date of Patent: Mar. 31, 2026

(54) ELECTRONIC DEVICE AND SENSOR PACKAGE WITH OPTICAL FUNCTIONAL LAYER THEREOF

(71) Applicants:LITE-ON SINGAPORE PTE. LTD., Singapore (SG); LITE-ON TECHNOLOGY CORPORATION, Taipei City (TW)

(72) Inventors: Rui-Tao Zheng, Singapore (SG); Heng-Chang Chen, New Taipei City (TW); Guang-Li Song, Singapore (SG); Wui-Pin Lee, Singapore (SG); Sin-Heng Lim, Singapore (SG)

(73) Assignees: LITE-ON SINGAPORE PTE. LTD., Singapore (SG); LITE-ON TECHNOLOGY CORPORATION, Taipei City (TW)

( * ) Notice: Subject to any disclaimer, the term of this patent is extended or adjusted under 35 U.S.C. 154(b) by 0 days.

(21) Appl. No.: 18/373,330

(22) Filed: Sep. 27, 2023

(65) Prior Publication Data

US 2024/0102854 A1     Mar. 28, 2024

Related U.S. Application Data

(60) Provisional application No. 63/410,298, filed on Sep. 27, 2022.

(30) Foreign Application Priority Data

Aug. 10, 2023     (CN) .......................... 202322138551.1

(51) Int. Cl.
*G01J 1/04*        (2006.01)
*G01J 1/42*        (2006.01)
(Continued)

(52) U.S. Cl.
CPC ........... *G01J 1/0488* (2013.01); *G01J 1/0411* (2013.01); *G01J 1/0474* (2013.01); *G01J 1/42* (2013.01);
(Continued)

(58) Field of Classification Search
CPC .......... G01J 1/0488; G01J 1/0411; G01J 1/42; G01J 3/4412; G02B 5/0242;
(Continued)

(56) References Cited

U.S. PATENT DOCUMENTS

2014/0223734 A1*    8/2014    Song ....................... H01L 24/97
                                                                     29/846
2018/0080815 A1*    3/2018    Nayak ................... G01J 1/0474
(Continued)

FOREIGN PATENT DOCUMENTS

CN        109659423  A        4/2019
CN        112867911  A        5/2021
(Continued)

OTHER PUBLICATIONS

Xiuting Zheng, Haijun Wang, Ying Liu, Daming Wu, Zhongli Zhao, Xiaoxiang He, Influence of light scattering particles on optical properties of polymer diffusion plate, Jul. 15, 2013, Trans Tech Publications Ltd., vols. 562-565, pp. 984-990 (Year: 2013).*

*Primary Examiner* — Georgia Y Epps
*Assistant Examiner* — Erin R Garber
(74) *Attorney, Agent, or Firm* — Li & Cai Intellectual Property (USA) Office

(57)        ABSTRACT

A sensor package includes a substrate, a light sensor disposed on the substrate, at least one optical filter disposed on the light sensor, and an optical functional layer that is light-permeable, is disposed on the substrate, covers the light sensor and the optical filter, and includes multiple light-scattering particles. The light sensor has a light receiv-
(Continued)

ing region, and receives light through the light receiving region. The optical filter covers the light receiving region. When the light passes through the optical filter within an incident angle range and is received by the light receiving region, the light sensor responds to a wavelength range of the light, and a response spectrum is obtained. Within the incident angle range, an absolute value of an offset measured at a crest of a waveform of the response spectrum is less than or equal to 10 nm. An electronic device is also provided.

26 Claims, 9 Drawing Sheets

(51) Int. Cl.
    *G02B 5/02*     (2006.01)
    *G01S 7/481*     (2006.01)
(52) U.S. Cl.
    CPC .......... *G02B 5/0242* (2013.01); *G01J 1/4204* (2013.01); *G01S 7/4813* (2013.01); *G01S 7/4814* (2013.01); *G01S 7/4816* (2013.01)
(58) Field of Classification Search
    CPC .......... H01L 27/14621; H10F 39/8053; H10F 39/12; H10F 39/806; H10F 39/024; H10F 39/804; H10F 39/805
    See application file for complete search history.

(56)     References Cited

U.S. PATENT DOCUMENTS

| | | | |
|---|---|---|---|
| 2019/0237500 A1* | 8/2019 | Enichlmair | H01L 27/14636 |
| 2020/0057158 A1* | 2/2020 | Chua | G01S 7/4813 |
| 2020/0366853 A1* | 11/2020 | Song | H01L 24/95 |
| 2021/0116366 A1* | 4/2021 | Hruska | G01N 21/255 |
| 2021/0148753 A1* | 5/2021 | Chen | G03B 29/00 |
| 2023/0139136 A1* | 5/2023 | Gross | G01J 3/0213 |
| | | | 250/226 |

FOREIGN PATENT DOCUMENTS

| | | | |
|---|---|---|---|
| CN | 113167863 A | 7/2021 |
| TW | 201526253 A | 7/2015 |
| TW | 201712818 A | 4/2017 |
| TW | 201918694 A | 5/2019 |
| TW | 201940902 A | 10/2019 |
| TW | 202035584 A | 10/2020 |

* cited by examiner

ELECTRONIC DEVICE AND SENSOR PACKAGE WITH OPTICAL FUNCTIONAL LAYER THEREOF

CROSS-REFERENCE TO RELATED PATENT APPLICATION

This application claims the benefit of priorities to the U.S. Provisional Patent Application Ser. No. 63/410,298, filed on Sep. 27, 2022, and China Patent Application No. 202322138551.1, filed on Aug. 10, 2023, in the People's Republic of China. The entire content of each of the above identified applications is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a photodetector, and more particularly to a sensor package that includes an optical functional layer and an electronic device that includes the sensor package.

BACKGROUND OF THE DISCLOSURE

A photodetector is often applied to various electronic devices. Generally, the photodetector can receive different ambient light sources (e.g., ultraviolet light, visible light, or infrared light), and converts an optical signal to a current signal. However, in the conventional technology, since an incident angle at which light is emitted to the photodetector may vary, the intensity of the optical signal received by the photodetector is often inconsistent, thereby negatively affecting the performance of the photodetector.

Therefore, how to overcome the above-mentioned deficiency through improvements in structural design has become one of the important issues to be solved in the related art.

SUMMARY OF THE DISCLOSURE

In response to the above-referenced technical inadequacy, the present disclosure mainly provides a sensor package having light-scattering particles, so as to solve the problem of unstable performance in a conventional photodetector caused by different incident angles of light.

In order to solve the above-mentioned problem, one of the technical aspects adopted by the present disclosure is to provide a sensor package, which includes a substrate, a light sensor, an optical filter, and an optical functional layer that is light-permeable. The light sensor is disposed on the substrate. The light sensor has a light receiving region, and receives light through the light receiving region. The optical filter is disposed on the light sensor, and covers the light receiving region. The optical functional layer is disposed on the substrate. The optical functional layer includes a plurality of light-scattering particles, and covers the light sensor and the optical filter. The light enters the optical functional layer and is scattered due to refraction/reflection of the light-scattering particles, and a scattering angle of the light ranges between 15 degrees and 120 degrees.

In order to solve the above-mentioned problem, another one of the technical aspects adopted by the present disclosure is to provide a sensor package, which includes a substrate, a light sensor, at least one optical filter, and an optical functional layer. The light sensor is disposed on the substrate. The light sensor has a light receiving region, and receives light through the light receiving region. The at least one optical filter is disposed on the light sensor, and covers the light receiving region. The optical functional layer includes a plurality of light-scattering particles. The optical functional layer is disposed on the substrate, and covers the light sensor and the at least one optical filter. When external light passes through the at least one optical filter within an incident angle range and is received by the light receiving region of the light sensor, the light sensor responds to a specific wavelength range of the external light, and a response spectrum is obtained. Within the incident angle range, an absolute value of an offset measured at a crest of a waveform of the response spectrum is less than or equal to 10 nm.

In order to solve the above-mentioned problem, yet another one of the technical aspects adopted by the present disclosure is to provide an electronic device, which includes a device body and the sensor package mentioned above.

Therefore, in the sensor package and the electronic device provided by the present disclosure, by virtue of "an optical functional layer including a plurality of light-scattering particles," "in response to external light passing through the at least one optical filter within an incident angle range and being received by the light receiving region of the light sensor, the light sensor responds to a specific wavelength range of the external light, and a response spectrum is obtained," and "within the incident angle range, an absolute value of an offset measured at a crest of a waveform of the response spectrum being less than or equal to 10 nm," the performance of the sensor package is less likely to be affected by incidence of the light at different incident angles.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

3

4

Figure 7:
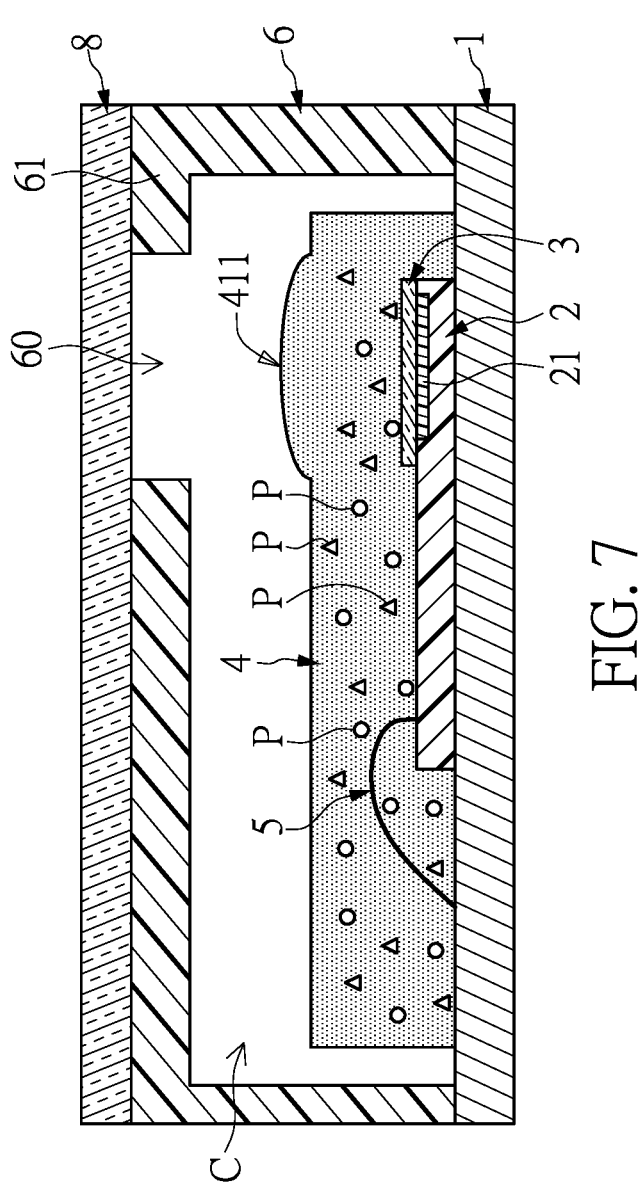
Figure 8:
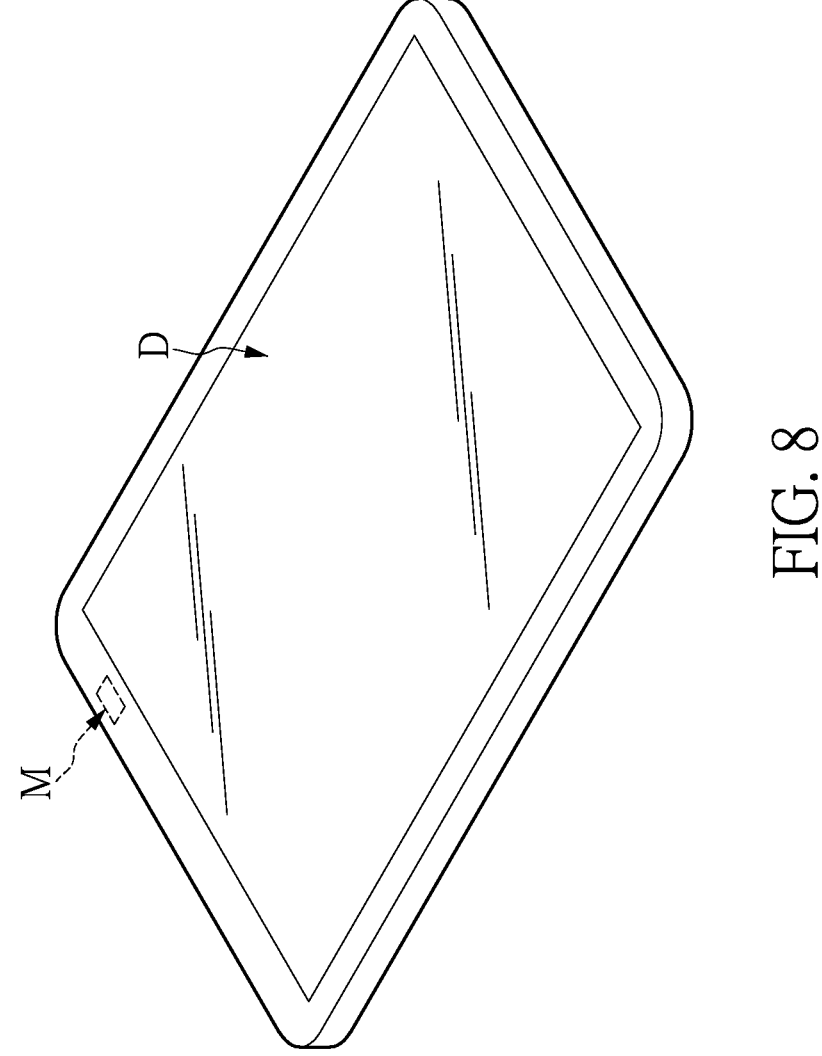
Figure 9:
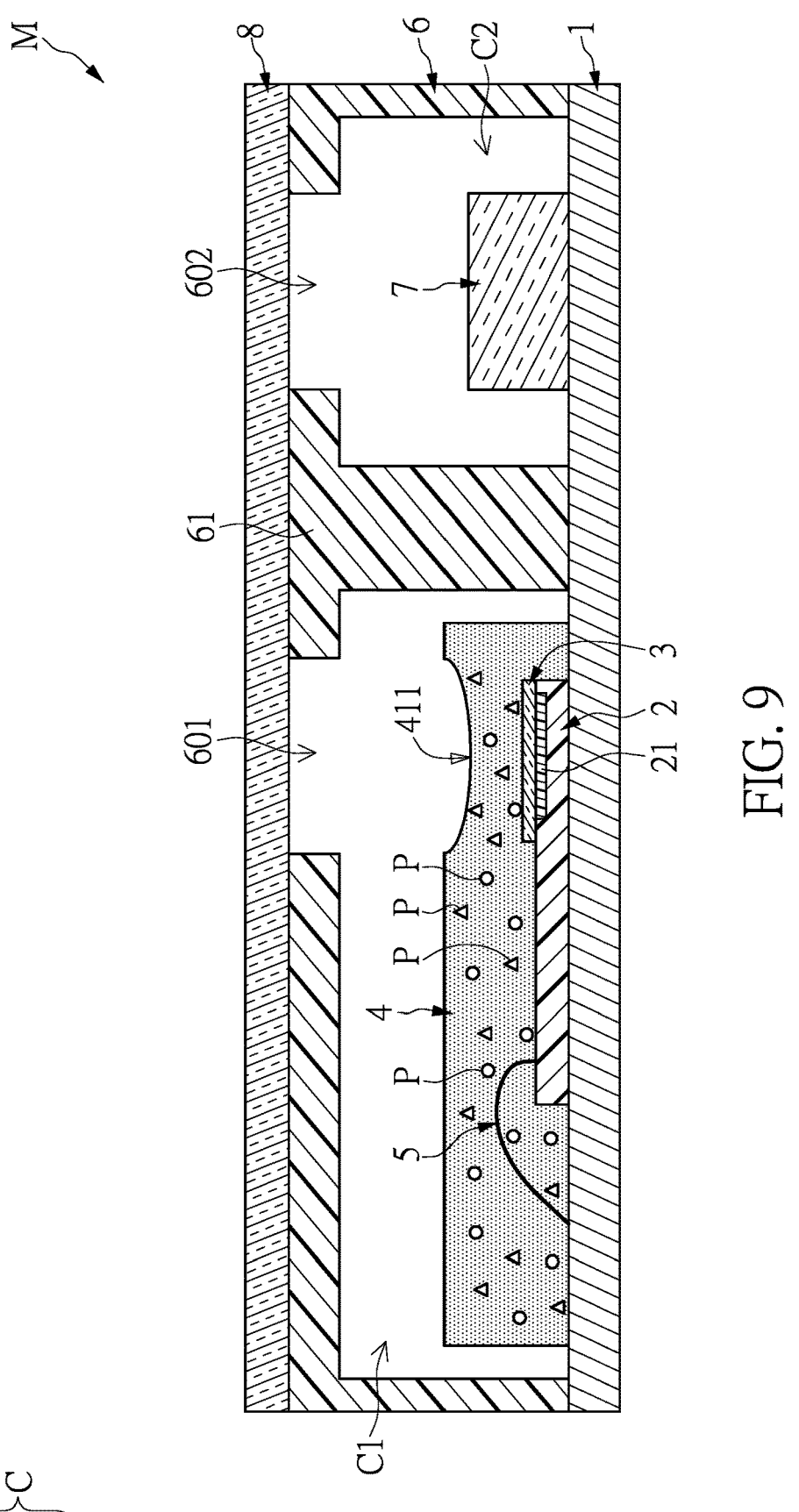

FIG. 7 is a schematic view of the sensor package according to a second embodiment of the present disclosure;

FIG. 8 is a schematic view showing the sensor package being applied to an electronic device according to the present disclosure; and FIG. 9 is a schematic view of the sensor package according to a third embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 1:
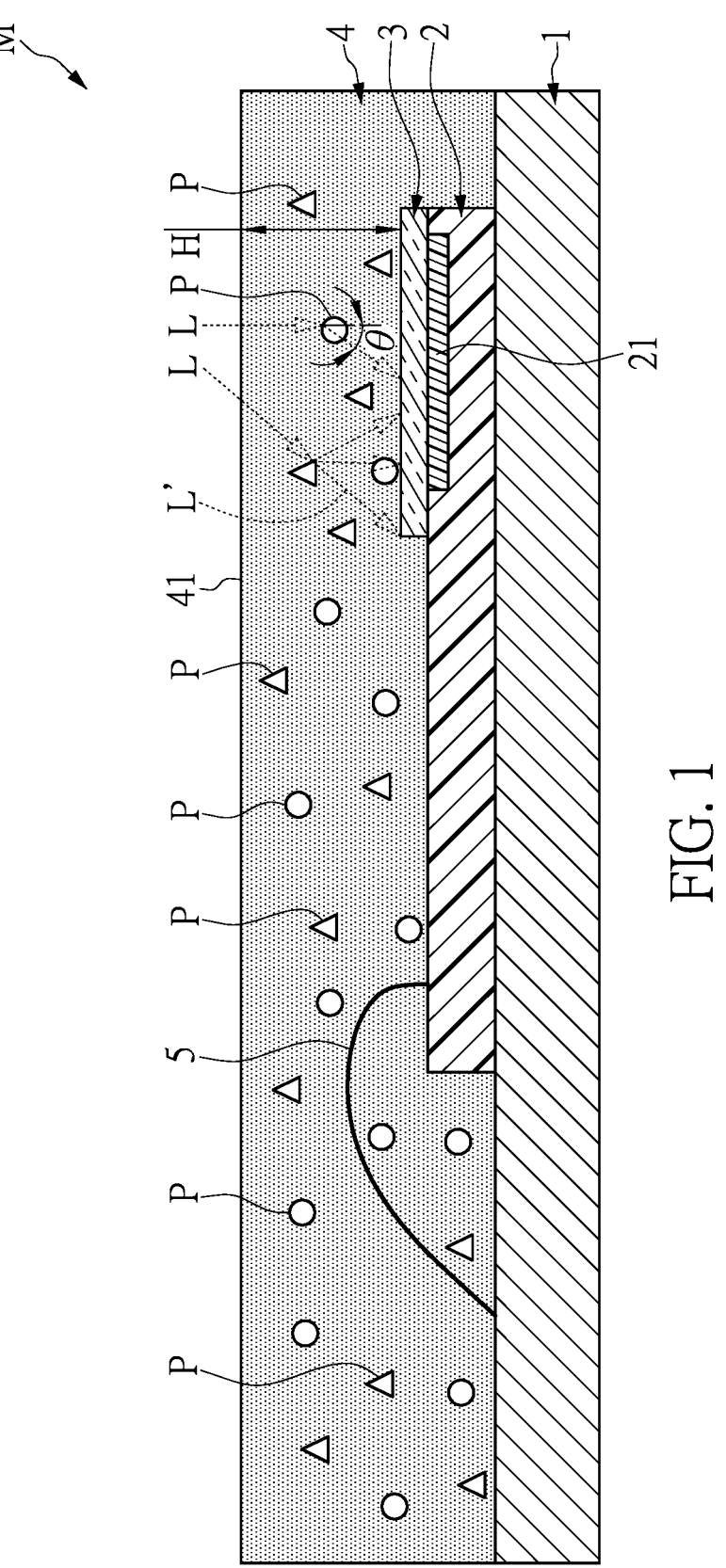
FIG. 1 is a schematic view of a sensor package according to a first embodiment of the present disclosure.

Reference is made to FIG. 1, which is a schematic view of a sensor package according to a first embodiment of the present disclosure. The present disclosure provides a sensor package M, which mainly includes a substrate 1, a light sensor 2, at least one optical filter 3, and an optical functional layer 4. The light sensor 2 is disposed on the substrate 1. In the embodiment of the present disclosure, the light sensor 2 may have one or more light receiving regions 21, such as photodetectors (e.g., photodiodes) and associated amplifiers and digitizing circuitry implemented on a light detector integrated circuit. The light receiving region 21 is located on an upper surface of the light sensor 2, and the light receiving region 21 is defined as a region that allows the light sensor 2 to perform a light receiving function. In addition, the light sensor 2 receives light (i.e., incident light L in FIG. 1) through the light receiving region 21. The at least one optical filter 3 is disposed on the light sensor 2, and covers the light receiving region 21, so as to modulate a light spectrum to be received by the light sensor 2. The optical functional layer 4 is disposed on the substrate 1, and covers the light sensor 2 and the at least one optical filter 3. The incident light L can be received by the light receiving region

21 after passing through the optical functional layer 4 and the at least one optical filter 3.

The quantity of the optical filter 3 is not limited in the present disclosure. In one embodiment of the present disclosure, the quantity of the optical filter 3 is one. However, in other embodiments, the sensor package M can also include multiple ones of the optical filter 3 that are stacked together.

The material of the optical filter 3 is not limited in the present disclosure. For example, the optical filter 3 can be a thin-film interference filter that is optically coated, or a color filter that is made of an organic absorption material. The interference filter can be, for example, an infrared (IR) cut-off filter, an RGB filer, or a bandpass filter. The bandpass filter can be, for example, a long-pass filter or a short-pass filter. According to different ones of the optical filter 3, a wavelength range that is applicable for the sensor package M of the present disclosure may vary. For example, the sensor package M is applicable for ultraviolet light, visible light, or infrared light, and the applicable wavelength range thereof is between 300 nm and 3,000 nm.

Referring to FIG. 1, the optical functional layer 4 can be a light-permeable package body that is doped with a plurality of light-scattering particles P. For example, the optical functional layer 4 of the present embodiment is a light diffusion layer, which can form into a light-permeable package that is doped with scattering particles by way of molding and covers the light sensor 2. The light-permeable package body can be made of, for example, epoxy resins that are insulating, light-permeable, and thermosetting, or polymers having similar effects. The light-scattering particles P can be organic or inorganic particles. If the light-scattering particles P are the organic particles, poly(methyl methacrylate) particles, styrene-acrylate copolymer particles, melamine resin particles, polycarbonate particles, polystyrene particles, crosslinked polystyrene particles, polyvinyl chloride particles, benzoguanamine-melamine-formaldehyde condensation polymer particles, and the like can be used. If the light-scattering particles P are the inorganic particles, silicon dioxide ($SiO_2$), zirconium dioxide ($ZrO_2$), titanium dioxide ($TiO_2$), aluminium oxide ($Al_2O_3$), indium (III) oxide ($In_2O_3$), zinc oxide (ZnO), stannic oxide ($SnO_2$), antimony trioxide ($Sb_2O_3$), and the like can be used. Any of these examples can be independently used, or more than two of these examples can be jointly used. However, the present disclosure is not limited thereto. The shape of each of the light-scattering particles P can be the same or different, and a particle size thereof ranges between 5 μm and 100 μm. When the light enters the optical functional layer 4, the incident light L is scattered due to interference of the light-scattering particles P. Regardless of changes of an incident light angle, a light angle distribution of the light that has undergone scattering is relatively stable. As shown in FIG. 1, the entering light (e.g., the incident light L) may pass through the light-scattering particles P of the optical functional layer 4, and scattered light L' (uniformity of the light can be enhanced by way of scattering) is generated and received by the light sensor 2. In the present disclosure, the light-scattering particles P of the optical functional layer 4 are located in an optical path of the incident light L, such that the incident light L that is entering at a non-normal angle of incidence can be scattered and redirected to the light sensor 2 (the light receiving region 21) for light collection. In other words, the optical functional layer 4 with the light-scattering particles P is configured to widen an angle range of incident light collected by the light sensor 2 (the light receiving region 21). Accordingly, the light sensor 2 is capable of efficiently receiving signal light over a wider-angle range, and within the wider-angle range (i.e., low dependency on an incident angle), the light sensor 2 can receive light that is uniform and has a consistent distribution of light intensity.

In the present embodiment, the top surface 41 of the optical functional layer 4 is spaced apart from the optical filter 3 by a predetermined distance H (which may be roughly identified as the thickness of the optical functional layer 4), and a scattering angle θ of the incident light L scattered by the light-scattering particles P is directly proportional to the predetermined distance H. The predetermined distance H ranges between 0.1 mm and 5 mm. Furthermore, the light-scattering particles P doped in the optical functional layer 4 is present at a percentage by weight ranging between 2 wt % and 10 wt %, and the scattering angle θ of the incident light L scattered by the light-scattering particles P is directly proportional to a percentage by weight (wt %) or a density of the light-scattering particles P.

Figure 2:
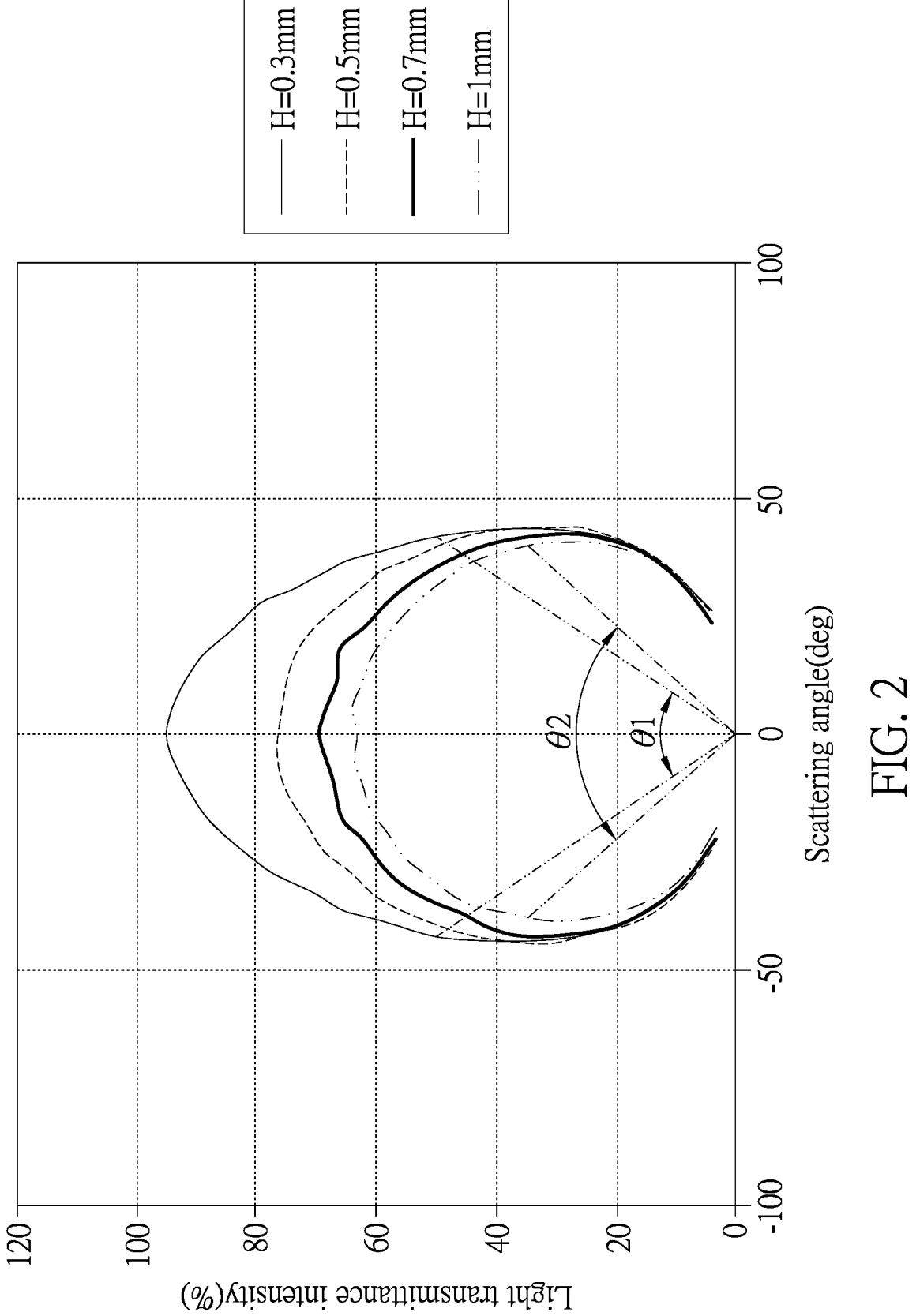
FIG. 2 is a light distribution curve diagram of light incident to an optical functional layer of the sensor package of the present disclosure under conditions of different thicknesses.

Reference is made to FIG. 1 and FIG. 2, in which FIG. 2 is a light distribution curve diagram of light incident to an optical functional layer of the sensor package of the present disclosure under conditions of different thicknesses. FIG. 2 exemplarily shows that a distribution of a scattering angle of the incident light L is from small to large when the predetermined distance H is sequentially 0.3 mm, 0.5 mm, 0.7 mm, and 1 mm. It should be noted that the scattering angle of the incident light L is generally represented by an angle at a position where a maximum value of a light transmittance intensity is approximately 50% (i.e., full width at half maximum (FWHM) of a light distribution curve). Here, the predetermined distance H is exemplified as being 0.3 mm and 1 mm. When the predetermined distance H is 0.3 mm, the scattering angle of the incident light L is θ1, and the scattering angle θ1 in FIG. 2 is approximately 60 degrees. When the predetermined distance H is 1 mm, the scattering angle of the incident light L is θ2, and the scattering angle θ2 in FIG. 2 is approximately 75 degrees. As such, it can be observed from FIG. 2 that the scattering angle θ2 measured when the predetermined distance H is 1 mm is greater than the scattering angle θ1 measured when the predetermined distance H is 0.3 mm.

That is to say, the greater the predetermined distance H is (i.e., the thicker the optical functional layer 4 is), the greater the scattering angle is. A light field distribution is also more similar to the Lambertian light shape (by definition, the FWHM of a Lambertian distribution is approximately 120 degrees). In the present disclosure, by using the optical functional layer 4 that is doped with the light-scattering particles P and adjusting the thickness of the optical functional layer 4 (which may be roughly identified as the predetermined distance H) according to practical requirements, a scattering angle of the light incident to the light sensor 2 within a specific incident angle range can range, for example, approximately between 60 degrees and 120 degrees. In this way, not only is the light uniform, but the distribution of light intensity is also substantially the same.

Figure 3:
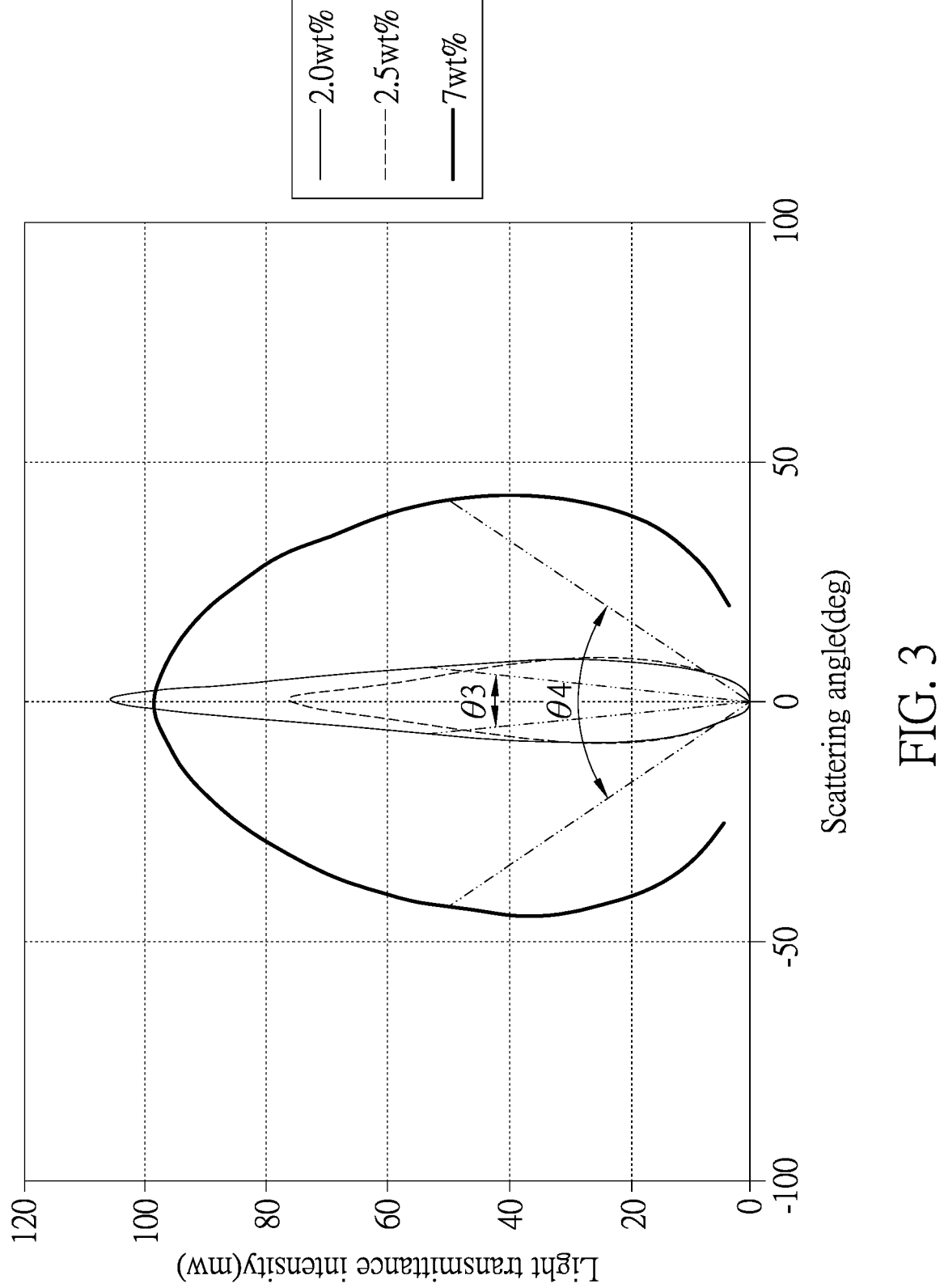
FIG. 3 is a light distribution curve diagram of the light incident to the optical functional layer of the sensor package of the present disclosure under conditions of different densities of light-scattering particles.

Reference is made to FIG. 1 and FIG. 3, in which FIG. 3 is a light distribution curve diagram of the light incident to the optical functional layer of the sensor package of the present disclosure under conditions of different densities (or % by weight) of light-scattering particles. In FIG. 3, when the light-scattering particles P doped in the optical functional layer 4 are sequentially 2 wt %, 2.5 wt %, and 7 wt %, the distribution of the scattering angle of the incident light L (generally represented by an angle at a position where a maximum value of a light transmittance intensity is approximately 50%, i.e., full width at half maximum (FWHM) of a light distribution curve) is from small to large. Here, the density (represented herein as a percentage by weight (wt %)) is exemplified as being 2 wt % and 7 wt %. When the density is 2 wt %, the scattering angle of the incident light L is θ3 (approximately 15 degrees). When the density is 7 wt %, the scattering angle of the incident light L is θ4 (approximately 60 degrees). As such, it can be observed from FIG. 3 that the scattering angle θ4 measured when the density is 7 wt % is greater than the scattering angle θ3 measured when the density is 2 wt %.

That is to say, the higher the density of the light-scattering particles P of the optical functional layer 4 is (i.e., the greater the quantity of the light-scattering particles P of the optical functional layer 4 is), the greater the scattering angle is. The light field distribution is also more similar to the Lambertian light shape (by definition, the FWHM of a Lambertian distribution is approximately 120 degrees). In the present disclosure, by using the optical functional layer 4 that is doped with the light-scattering particles P and adjusting a percentage by weight of the light-scattering particles P doped in the optical functional layer 4 according to practical requirements, the scattering angle of the light incident to the light sensor 2 within the specific incident angle range can range, for example, approximately between 15 degrees and 120 degrees. In this way, not only is the light uniform, but the distribution of light intensity is also substantially the same.

It should be noted that, in another embodiment, the particle size (a particle diameter ranging between 5 μm and 100 μm) of the light-scattering particles P doped in the optical functional layer 4 can also be changed to increase the scattering angle, such that the light is uniform and the distribution of light intensity is substantially the same. Based on the results mentioned above, it can be observed that, through the configuration of the optical functional layer 4 that is doped with the light-scattering particles P, the scattering angle of the light incident to the light sensor 2 within the specific incident angle range can range approximately between 15 degrees and 120 degrees. For example, according to actual product requirements, a scattering angle ranging approximately between 40 degrees and 75 degrees can be generated in one embodiment.

Figure 4:
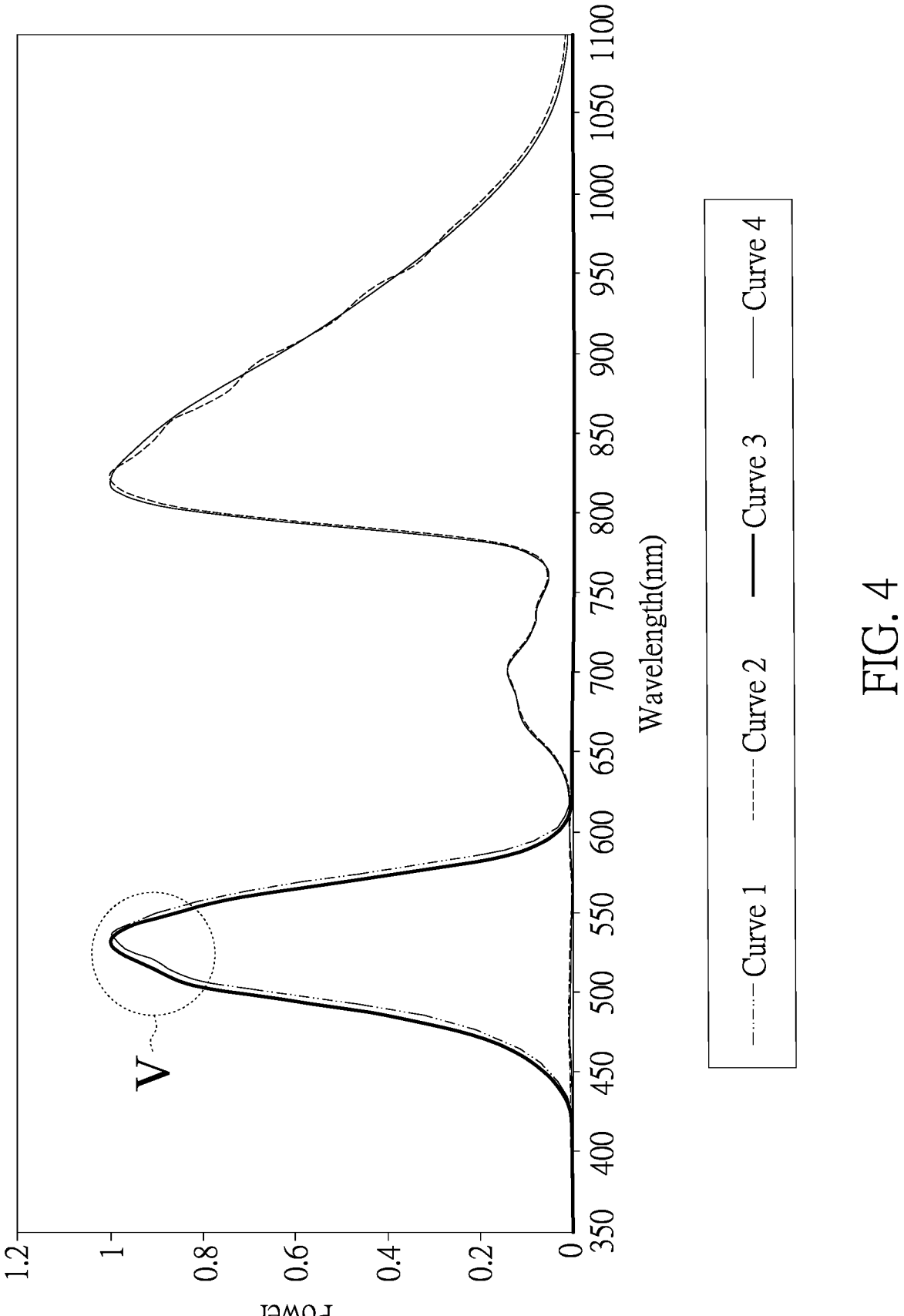
FIG. 4 is a curve diagram of a response spectrum of the sensor package according to the present disclosure.
Figure 5:
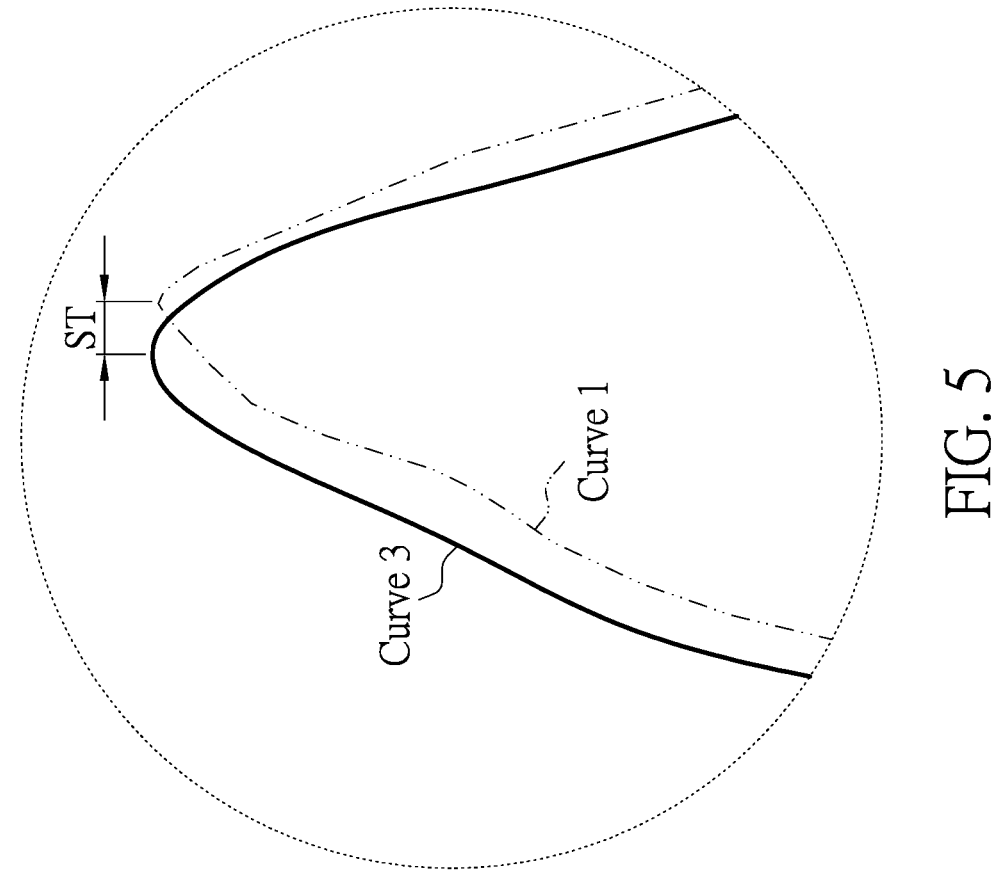
FIG. 5 is a schematic enlarged view of part V of FIG. 4.

Referring to FIG. 4 and FIG. 5, FIG. 4 is a curve diagram of a response spectrum of the sensor package according to the present disclosure, and FIG. 5 is a schematic enlarged view of part V of FIG. 4. In the present disclosure, a degree of displacement in a response spectrum is measured by emitting the incident light L to the sensor package M at different incident angles (e.g., from 0 degrees to 30 degrees). A spectral response of a photodetector refers to an optical wavelength or frequency range to which the photodetector has a significant responsivity. That is to say, the sensor package M is used to receive light having a specific wavelength, and the response spectrum can be obtained.

The greater an offset of the response spectrum, the greater the influence of the incident angle on the photodetector (i.e., higher dependency on the incident angle). In other words, the performance of the photodetector is likely to be affected by different incident angles (changes of the incident angle), thereby causing detection inaccuracy.

When the optical filter 3 is the interference filter, the light sensor 2 responds to a wavelength range of between 400 nm and 650 nm, and a first response spectrum is obtained. When the optical filter 3 is the color filter, the light sensor 2 responds to a wavelength range of between 750 nm and 1,100 nm, and a second response spectrum is obtained. In FIG. 4, Curve 1 is a measurement result obtained when the optical filter 3 of the sensor package M is the interference filter and the incident angle is 0 degrees, Curve 2 is a measurement result obtained when the optical filter 3 of the sensor package M is the color filter that is made of the organic absorption material and the incident angle is 0 degrees, Curve 3 is a measurement result obtained when the optical filter 3 of the sensor package M is the interference filter and the incident angle is 30 degrees, and Curve 4 is a measurement result obtained when the optical filter 3 of the sensor package M is the color filter that is made of the organic absorption material and the incident angle is 30 degrees.

When the light is emitted to the sensor package M at different incident angles, it is common for the generated response spectrum to be slightly shifted (which is caused by differences of the incident angle). In FIG. 4 and FIG. 5, the first response spectrum (Curve 1 and Curve 3) is exemplified for illustrative purposes. The higher an overlapping degree between Curve 1 and Curve 3 is (which is an ideal state and indicates that the photodetector is completely unaffected by the incident angle), the smaller the degree of displacement of a spectrum is. In other words, when Curve 1 completely overlaps with Curve 3, the offset measured at a crest of a spectrum waveform is 0 (i.e., no displacement). In the embodiment of the present disclosure, through the configuration of the optical functional layer 4, dependency on the incident angle can be greatly reduced. Accordingly, an offset ST (which is an absolute value) measured at the crest of a waveform of the first response spectrum that is generated when the incident angle of the light is 0 degrees and 30 degrees is less than or equal to 10 nm. The offset ST (which is an absolute value) measured at the crest of a waveform of the second response spectrum (Curve 2 and Curve 4) ranges between 0 nm and 5 nm.

Figure 6:
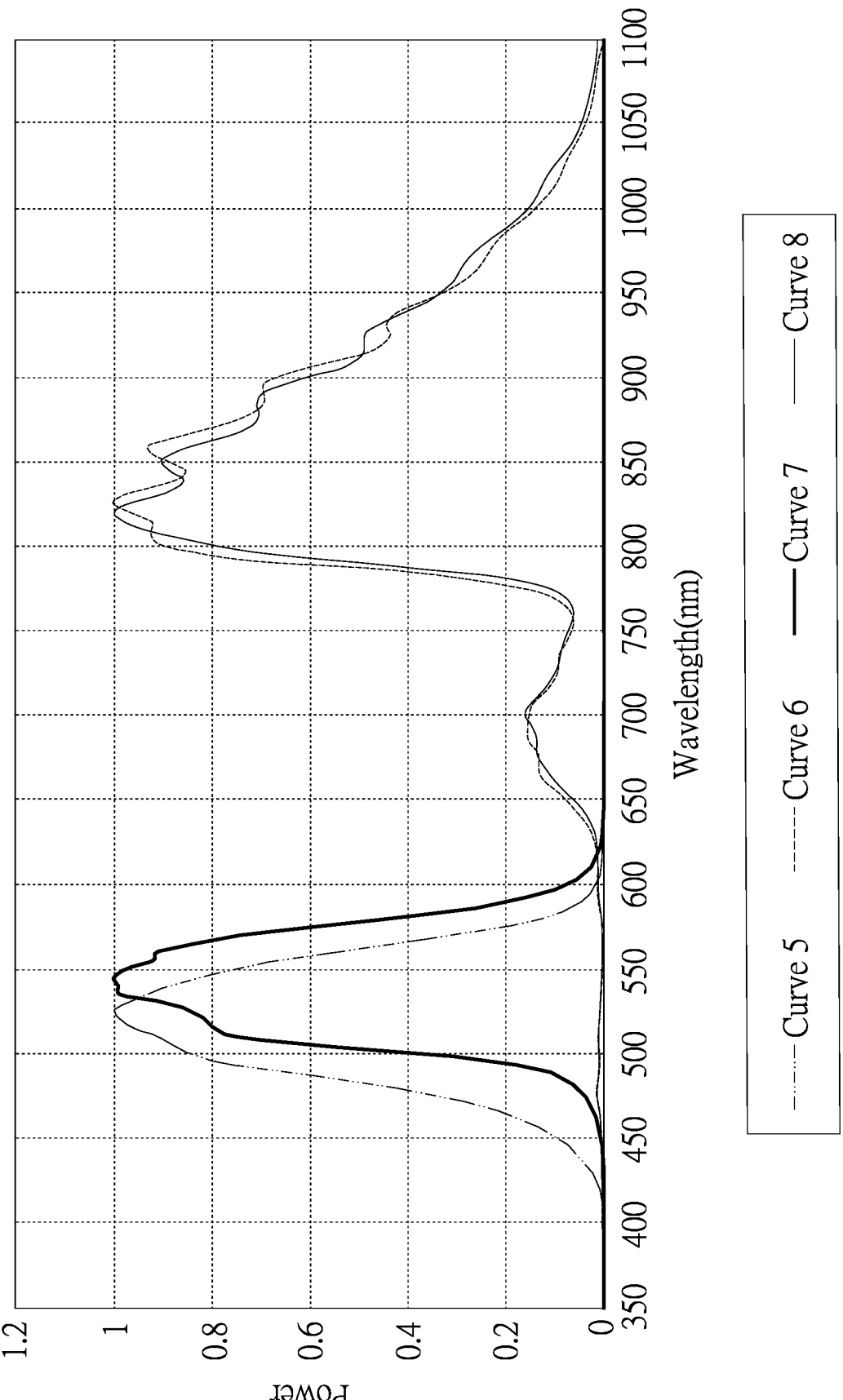
FIG. 6 is a curve diagram of the response spectrum of a conventional sensor package.

On the other hand, FIG. 6 is a curve diagram of the response spectrum of a conventional sensor package. Specifically, the response spectrum shown in FIG. 6 is generated when a transparent package body of a sensor package is not doped with light-scattering particles. Measurement conditions of Curve 5 are that its optical filter is the interference filter, and the incident angle is 0 degrees. Measurement conditions of Curve 6 are that its optical filter is the color filter that is made of the organic absorption material, and the incident angle is 0 degrees. Measurement conditions of Curve 7 are that its optical filter is the interference filter, and the incident angle is 30 degrees. Measurement conditions of Curve 8 are that its optical filter is the color filter that is made of the organic absorption material, and the incident angle is 30 degrees.

According to Curve 5 and Curve 7, the offset (which is an absolute value) measured at the crest of the spectrum waveform is approximately 30 nm. According to Curve 6 and Curve 8, the offset (which is an absolute value) measured at the crest of the spectrum waveform is greater than 10 nm.

Since the transparent package body of the conventional sensor package is not doped with the light-scattering particles, the offset of its spectrum waveform is obviously larger than that provided in the present disclosure. The sensor package M of the present disclosure differs from the conventional technology in that, the light-scattering particles P are doped in the optical functional layer 4, the particle size of the light-scattering particles P is limited to a range of between 5 μm and 100 μm, the light-scattering particles P doped within the optical functional layer 4 are limited to a range of between 2 wt % and 10 wt %, and the predetermined distance H between the top surface 41 of the optical functional layer 4 and the optical filter 3 (which can be identified as the thickness of the optical functional layer 4) is limited to a range of between 0.1 mm and 5 mm. Hence, the offset (which is an absolute value) measured at the crest of the waveform of the response spectrum is reduced to be not greater than 10 nm, and the performance of the sensor package M in the present disclosure is less likely to be affected by incidence of the light at different incident angles, thereby improving the stability of the overall performance and the accuracy. Simply put, such configuration can reduce the dependency on the incident angle, which allows the sensor package M to be less limited by the incident angle range or the type of the optical filter 3.

Second Embodiment

Reference is made to FIG. 7, which is a schematic view of the sensor package according to a second embodiment of the present disclosure. In the second embodiment, apart from the substrate 1, the light sensor 2, the at least one optical filter 3, and the optical functional layer 4, the sensor package M further includes a conductive element 5 and a cover 6. The conductive element 5 of the present embodiment can be a metal wire, in which one end thereof is connected to the substrate 1 having electrically conductive patterned conductors provided thereon, and another end thereof is connected to an electrode end (not shown) of the light sensor 2. The optical functional layer 4 covers the light sensor 2, the at least one optical filter 3, and the conductive element 5. It should be noted that, in other configurations, the light sensor 2 can also be disposed on the substrate 1 in a flip-chip manner. However, the present disclosure is not limited thereto. The principle of electrical connection between the light sensor 2 and the substrate 1 is well known to those skilled in the art, and will not be reiterated herein.

The cover 6 can be made of an opaque material. The cover 6 has at least one opening 60. The at least one opening 60 of the cover 6 is configured to correspond in position to the light receiving region 21. Further, the cover 6 is disposed above the optical functional layer 4, and shields a non-functional region of the sensor package M. In one embodiment of the present disclosure, the cover 6 is disposed on the substrate 1. For example, the cover 6 can be an opaque layer that covers a surface of the optical functional layer 4 or a light-shielding casing. In FIG. 7, the cover 6 is exemplified as being the light-shielding casing. The cover 6 and the substrate 1 jointly define an accommodating chamber C, and the light sensor 2, the at least one optical filter 3, the optical functional layer 4, and the conductive element 5 are disposed in the accommodating chamber C.

The cover 6 can not only be used to protect the sensor package M, but also to block undesired crosstalk or interference from outside. In addition, the sensor package M can further include at least one light-permeable member 8 that is disposed on the cover 6 and covers the at least one opening 60. In the present embodiment, the at least one light-permeable member 8 can be transparent glass having a flat shape or other light-permeable optical elements, and the at least one light-permeable member 8 can be formed in or located above the at least one opening 60. However, the present disclosure is not limited thereto.

Furthermore, a lens unit 411 can be formed on the top surface 41 of the optical functional layer 4. The lens unit 411 is located above the at least one optical filter 3, and corresponds in position to the at least one optical filter 3 and the light receiving region 21. The type of the lens unit 411 is not limited in the present disclosure. For example, the lens unit 411 can be a flat-shaped lens, a convex-shaped lens, or a concave-shaped lens. The lens unit 411 of the second embodiment is the convex-shaped lens. When the lens unit 411 is the convex-shaped lens, a surface area of a lens is enlarged, and can thereby increase the light-receiving amount in the light sensor 2. In this way, the sensitivity of the light sensor 2 is enhanced.

Reference is made to FIG. 8, which is a schematic view showing the sensor package being applied to an electronic device according to the present disclosure. The sensor package M of the present disclosure is disposed in a device body of an electronic device D. The sensor package M can serve as a photodetector/light sensor for receiving different ambient light sources (e.g., ultraviolet light, visible light, or infrared light) and converting an optical signal to a current signal, and can be applied to various electronic devices. The type of the electronic device D is not limited in the present disclosure. For example, the electronic device D can be a computing apparatus (e.g., a smartphone, a tablet computer, and a laptop computer), a small-sized portable device (e.g., a wearable device and headphones), an electronic apparatus that has a display (e.g., a television and a computer screen), or even a detection and monitoring apparatus for horticul-tural or industrial use. It is worth mentioning that, in the present disclosure, the device body of the electronic device D can be an opaque outer casing. In one embodiment, the cover 6 mentioned above can also be one part of the device body of the electronic device D.

Third Embodiment

Reference is made to FIG. 9, which is a schematic view of the sensor package according to a third embodiment of the present disclosure. The structure of the sensor package of the third embodiment is similar to that of the second embodi-ment, and the similarities therebetween will not be reiterated herein. In the third embodiment, the sensor package M further includes a light-emitting element 7 disposed on the substrate 1, and the cover 6 further includes a partition 61 that extends within an internal compartment of the cover 6. The partition 61 divides the accommodating chamber C into a first chamber C1 and a second chamber C2. The light sensor 2, the at least one optical filter 3, the conductive element 5, and the optical functional layer 4 are disposed in the first chamber C1, and the light-emitting element 7 is disposed in the second chamber C2.

Specifically, the cover 6 has two openings (601, 602) that are respectively and correspondingly in spatial communica-tion with the first chamber C1 and the second chamber C2. The opening that is in spatial communication with the first chamber C1 is a light-receiving hole 601, and the opening that is in spatial communication with the second chamber C2 is a light-emitting hole 602. The light-receiving hole 601 corresponds in position to the light receiving region 21 of the light sensor 2, and the light-emitting hole 602 corresponds in position to the light-emitting element 7. Through the configuration of the partition 61, the light sensor 2 is separated from the light-emitting element 7. Accordingly, during operations of the light sensor 2 and the light-emitting element 7, the light emitted by the light-emitting element 7 can be prevented from being directly received by the light sensor 2 (which may otherwise cause interference and decrease detection accuracy).

The sensor package M of the present embodiment can serve as an optical sensor device of a proximity sensor module or a time-of-flight sensor module, and can similarly be applied to various electronic devices.

For example, the light-emitting element 7 disposed in the second chamber C2 can emit the light (e.g., infrared light) to the outside through the light-emitting hole 602. Then, the light can be reflected back by an external object. The reflected light is emitted to the first chamber C1 through the light-receiving hole 601, passes through the optical func-tional layer 4 that includes the light-scattering particles P and the at least one optical filter 3, and is received by the light receiving region 21 of the light sensor 2. The type of the light sensor 2 or the light-emitting element 7 is not limited in the present disclosure. The light-emitting element 7 can be an LED die (e.g., an infrared light-emitting diode (IR LED)), and is capable of emitting the infrared light to the external object. The light sensor 2 can be a transistor die (e.g., a phototransistor (PTR) or a photosensitive integrated circuit), or can be a silicon-based photodiode or a photo-diode that uses other photosensitive materials as its base.

In the present embodiment, the at least one light-perme-able member 8 of the sensor package M can cover the light-emitting hole 602 and the light-receiving hole 601. It should be noted that the at least one light-permeable member 8 can be a transparent glass cover plate, or can include two light-permeable optical elements to respectively seal the two openings (601, 602), but the present disclosure is not limited thereto.

Furthermore, in the third embodiment, the lens unit 411 disposed on the top surface 41 of the optical functional layer 4 can be the concave-shaped lens. When the lens unit 411 is the concave-shaped lens, only the light that is incident at a specific angle is allowed to enter since a surface of the concave-shaped lens is inwardly recessed from the top surface 41 of the optical functional layer 4. In other words, entrance of undesired light can be prevented.

During manufacturing of the sensor package M of the present disclosure, at least the following processes are included: assembling the light sensor 2 to the substrate 1 and disposing the at least one optical filter 3 above the light sensor 2; performing a wire bonding procedure, in which the two ends of the conductive element 5 are respectively and electrically connected to the substrate 1 and the light sensor 2; molding a package material doped with the light-scatter-ing particles P onto the substrate 1, so as to cover the light sensor 2, the at least one optical filter 3, and the conductive element 5 and form the optical functional layer 4; and disposing the cover 6 onto the substrate 1 for formation of the sensor package M.

Beneficial Effects of the Embodiments

In conclusion, in the sensor package and the electronic device provided by the present disclosure, by virtue of "an optical functional layer including a plurality of light-scat-tering particles," "in response to external light passing through the at least one optical filter within an incident angle range and being received by the light receiving region of the light sensor, the light sensor responds to a specific wave-length range of the external light, and a response spectrum is obtained," and "within the incident angle range, an absolute value of an offset measured at a crest of a waveform of the response spectrum being less than or equal to 10 nm," the performance of the sensor package is less likely to be affected by incidence of the light at different incident angles.

Specifically, in the present disclosure, by using the optical functional layer that is doped with the light-scattering par-ticles and adjusting the thickness of the optical functional layer (which may be roughly identified as the predetermined distance H) according to practical requirements, the scattering angle of the light incident to the light sensor within the specific incident angle range can range, for example, approximately between 60 degrees and 120 degrees. In this way, not only is the light uniform, but the distribution of light intensity is also substantially the same.

More specifically, in the present disclosure, by using the optical functional layer that is doped with the light-scattering particles and adjusting the percentage by weight of the light-scattering particles doped in the optical functional layer according to practical requirements, the scattering angle of the light incident to the light sensor within the specific incident angle range can range, for example, approximately between 15 degrees and 120 degrees. In this way, not only is the light uniform, but the distribution of light intensity is also substantially the same.

A conventional photodetector is easily affected by the incident angle, i.e., having a high incident angle dependency. In the sensor package of the present disclosure, the particle size of the light-scattering particles is limited to a range of between 5 μm and 100 μm, the light-scattering particles doped within the optical functional layer are limited to a range of between 2 wt % and 10 wt %, or the predetermined distance H between the top surface of the optical functional layer and the optical filter (which can be identified as the thickness of the optical functional layer) is limited to a range of between 0.1 mm and 5 mm. Hence, displacement/offset occurring at the crest of the waveform of the response spectrum as a result of different incident angles is significantly reduced. For example, the absolute value of the offset is less than or equal to 10 nm. Accordingly, the performance of the sensor package is less likely to be affected by incidence of the light at different incident angles, thereby improving the stability of the overall performance and the accuracy.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A sensor package, comprising:
a substrate;
a light sensor disposed on a surface of the substrate, wherein the light sensor includes a light receiving region;
an optical filter disposed on the light sensor and covering the light receiving region; and
an optical functional layer, being light-permeable, disposed on the substrate and packaging the light sensor and the optical filter, wherein the optical functional layer directly contacts the optical filter, and surfaces of the light sensor that are exposed outside the optical filter, and the optical functional layer has a plurality of light-scattering particles that directly covers the light sensor and the optical filter;

wherein, when light enters the optical functional layer and is scattered due to interference of the light-scattering particles, and received by the light receiving region;
wherein a top surface of the optical functional layer is spaced apart from the optical filter by a predetermined distance; and
wherein the light is emitted to the light receiving region through the optical functional layer and the optical filter, and the predetermined distance is directly proportional to a scattering angle formed when the light passes through the optical functional layer.

2. The sensor package according to claim 1, wherein a percentage by weight of the light-scattering particles doped in the optical functional layer ranges between 2% and 10%, and the percentage by weight of the light-scattering particles is directly proportional to the scattering angle formed when the light passes through the optical functional layer.

3. The sensor package according to claim 1, wherein the optical filter is an interference filter that is optically coated, or is a color filter that is made of an organic absorption material.

4. The sensor package according to claim 3, wherein, when the optical filter is the interference filter, the light sensor responds to a wavelength range of between 400 nm and 650 nm, and a first response spectrum is obtained; or wherein, when the optical filter is the color filter, the light sensor responds to a wavelength range of between 750 nm and 1,100 nm, and a second response spectrum is obtained.

5. The sensor package according to claim 4, wherein, when an incident angle of the light ranges between 0 degrees and 30 degrees, an absolute value of an offset measured at a crest of a waveform of one of the first response spectrum and the second response spectrum ranges between 0 nm and 10 nm.

6. The sensor package according to claim 1, wherein a lens unit is formed on a top surface of the optical functional layer, and the lens unit is a flat-shaped lens, a convex-shaped lens, or a concave-shaped lens; wherein the lens unit is located above the optical filter, and corresponds in position to the optical filter and the light receiving region.

7. The sensor package according to claim 6, further comprising a cover, wherein the cover has at least one opening and is disposed on the substrate, the cover and the substrate jointly define an accommodating chamber, the light sensor, the optical filter, and the optical functional layer are disposed in the accommodating chamber, and the at least one opening is configured to correspond in position to the light receiving region of the light sensor.

8. The sensor package according to claim 7, wherein the cover includes a partition disposed in the cover, and a quantity of the at least one opening of the cover is two; wherein the partition divides the accommodating chamber into a first chamber and a second chamber, the two openings are respectively and correspondingly in spatial communication with the first chamber and the second chamber, and the light sensor, the optical filter, and the optical functional layer are disposed in the first chamber.

9. The sensor package according to claim 8, further comprising a light-emitting element disposed in the second chamber, wherein one of the openings of the cover that is in spatial communication with the first chamber is a light-receiving hole, another one of the openings of the cover that is in spatial communication with the second chamber is a light-emitting hole, the light-receiving hole corresponds in position to the lens unit, and the light-emitting hole corresponds in position to the light-emitting element.

10. The sensor package according to claim 9, further comprising at least one light-permeable member, wherein the at least one light-permeable member is disposed on the cover, and covers the light-emitting hole and the light-receiving hole.

11. The sensor package according to claim 1, wherein a particle size of each of the light-scattering particles ranges between 5 μm and 100 μm.

12. The sensor package according to claim 1, wherein the light enters the optical functional layer and is scattered due to the interference of the light-scattering particles, and the scattering angle of the light ranges between 40 degrees and 75 degrees.

13. A sensor package, comprising:

a device body; and the sensor package as claimed in claim 1, wherein the sensor package is disposed in the device body.

14. A sensor package, comprising:

a substrate;

a light sensor disposed on the substrate, wherein the light sensor has a light receiving region, and receives light through the light receiving region;

at least one optical filter disposed on the light sensor and covering the light receiving region; and an optical functional layer being light-permeable and including a plurality of light-scattering particles, wherein the optical functional layer is disposed on the substrate, and covers the light sensor and the at least one optical filter;

wherein, when external light passes through the at least one optical filter within an incident angle range and is received by the light receiving region of the light sensor, the light sensor responds to a specific wavelength range of the external light, and a response spectrum is obtained; wherein, within the incident angle range, an absolute value of an offset measured at a crest of a waveform of the response spectrum is less than or equal to 10 nm.

15. The sensor package according to claim 14, wherein the at least one optical filter is an interference filter that is optically coated, or is a color filter that is made of an organic absorption material.

16. The sensor package according to claim 15, wherein, when the at least one optical filter is the interference filter, the light sensor responds to a wavelength range of between 400 nm and 650 nm, and a response spectrum is obtained; or wherein, when the at least one optical filter is the color filter, the light sensor responds to a wavelength range of between 750 nm and 1,100 nm, and a response spectrum is obtained.

17. The sensor package according to claim 14, wherein a particle size of each of the light-scattering particles ranges between 5 μm and 100 μm.

18. The sensor package according to claim 14, wherein a top surface of the optical functional layer is spaced apart from the at least one optical filter by a predetermined distance; wherein the light is emitted to the light receiving region through the optical functional layer and the at least one optical filter, and the predetermined distance is directly proportional to a scattering angle formed when the light passes through the optical functional layer.

19. The sensor package according to claim 14, wherein a percentage by weight of the light-scattering particles doped in the optical functional layer ranges between 2% and 10%, and the percentage by weight of the light-scattering particles is directly proportional to a scattering angle formed when the light passes through the optical functional layer.

20. The sensor package according to claim 14, wherein a lens unit is formed on a top surface of the optical functional layer, and the lens unit is a flat-shaped lens, a convex-shaped lens, or a concave-shaped lens; wherein the lens unit is located above the at least one optical filter, and corresponds in position to the at least one optical filter and the light receiving region.

21. The sensor package according to claim 20, further comprising a cover, wherein the cover has at least one opening and is disposed on the substrate, the cover and the substrate jointly define an accommodating chamber, the light sensor, the at least one optical filter, and the optical functional layer are disposed in the accommodating chamber, and the at least one opening is configured to correspond in position to the light receiving region of the light sensor.

22. The sensor package according to claim 21, wherein the cover includes a partition disposed in the cover, and a quantity of the at least one opening of the cover is two; wherein the partition divides the accommodating chamber into a first chamber and a second chamber, the two openings are respectively and correspondingly in spatial communication with the first chamber and the second chamber, and the light sensor, the at least one optical filter, and the optical functional layer are disposed in the first chamber.

23. The sensor package according to claim 22, further comprising a light-emitting element disposed in the second chamber, wherein one of the openings of the cover that is in spatial communication with the first chamber is a light-receiving hole, another one of the openings of the cover that is in spatial communication with the second chamber is a light-emitting hole, the light-receiving hole corresponds in position to the lens unit, and the light-emitting hole corresponds in position to the light-emitting element.

24. The sensor package according to claim 23, further comprising at least one light-permeable member, wherein the at least one light-permeable member is disposed on the cover, and covers the light-emitting hole and the light-receiving hole.

25. A sensor package, comprising:

a device body; and the sensor package as claimed in claim 14, wherein the sensor package is disposed in the device body.

26. A sensor package, comprising:

a substrate;

a light sensor disposed on the substrate, wherein the light sensor has a light receiving region, and receives light through the light receiving region;

an optical filter disposed on the light sensor and covering the light receiving region; and an optical functional layer being light-permeable and disposed on the substrate, wherein the optical functional layer includes a plurality of light-scattering particles, and covers the light sensor and the optical filter;

wherein the light enters the optical functional layer and is scattered due to interference of the light-scattering particles, a percentage by weight of the light-scattering particles doped in the optical functional layer ranges between 2% and 10%, and the percentage by weight of the light-scattering particles is directly proportional to a scattering angle formed when the light passes through the optical functional layer.

* * * * *